United States Patent
Huppe et al.

(10) Patent No.: US 9,896,953 B2
(45) Date of Patent: Feb. 20, 2018

(54) SEAL RUNNER

(71) Applicant: PRATT & WHITNEY CANADA CORP., Longueuil (CA)

(72) Inventors: Roger Huppe, Chambly (CA); Jean-Francois Caron, Drummondville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 848 days.

(21) Appl. No.: 14/570,325

(22) Filed: Dec. 15, 2014

(65) Prior Publication Data

US 2016/0169019 A1    Jun. 16, 2016

(51) Int. Cl.
| | |
|---|---|
| *F01D 11/00* | (2006.01) |
| *F16J 15/16* | (2006.01) |
| *F01D 25/12* | (2006.01) |
| *F16J 15/324* | (2016.01) |

(52) U.S. Cl.
CPC ............ *F01D 11/003* (2013.01); *F01D 25/12* (2013.01); *F16J 15/162* (2013.01); *F16J 15/324* (2013.01); *F05D 2260/20* (2013.01); *Y02T 50/675* (2013.01)

(58) Field of Classification Search
CPC ........ F01D 11/003; F01D 25/12; F01D 5/181; F16J 15/162; F16J 15/324; F05D 2260/20; Y02T 50/675
See application file for complete search history.

(56) References Cited

U.S. PATENT DOCUMENTS

| | | | |
|---|---|---|---|
| 3,623,825 | A | 11/1971 | Schneider |
| 4,969,652 | A | 11/1990 | Munson |
| 5,813,830 | A | 9/1998 | Smith et al. |
| 7,431,504 | B1 | 10/2008 | Pelfrey |
| 9,631,508 | B2 * | 4/2017 | Blais ................. F01D 11/00 |
| 2014/0369832 | A1 | 12/2014 | Blais et al. |

* cited by examiner

*Primary Examiner* — Richard Edgar
(74) *Attorney, Agent, or Firm* — Norton Rose Fulbright Canada

(57) ABSTRACT

A seal runner for a gas turbine engine, the seal runner including an annular body having a sealed cavity defined therein, the cavity being elongated along an axial direction of the body and being annular, the cavity at least partially filled with a coolant, the coolant being liquid across a range of operating temperatures of the gas turbine engine, the coolant having a temperature dependent density across the range of operating temperatures of the gas turbine engine. A gas turbine engine and a method of cooling a seal runner exposed to a temperature gradient are also discussed.

20 Claims, 6 Drawing Sheets

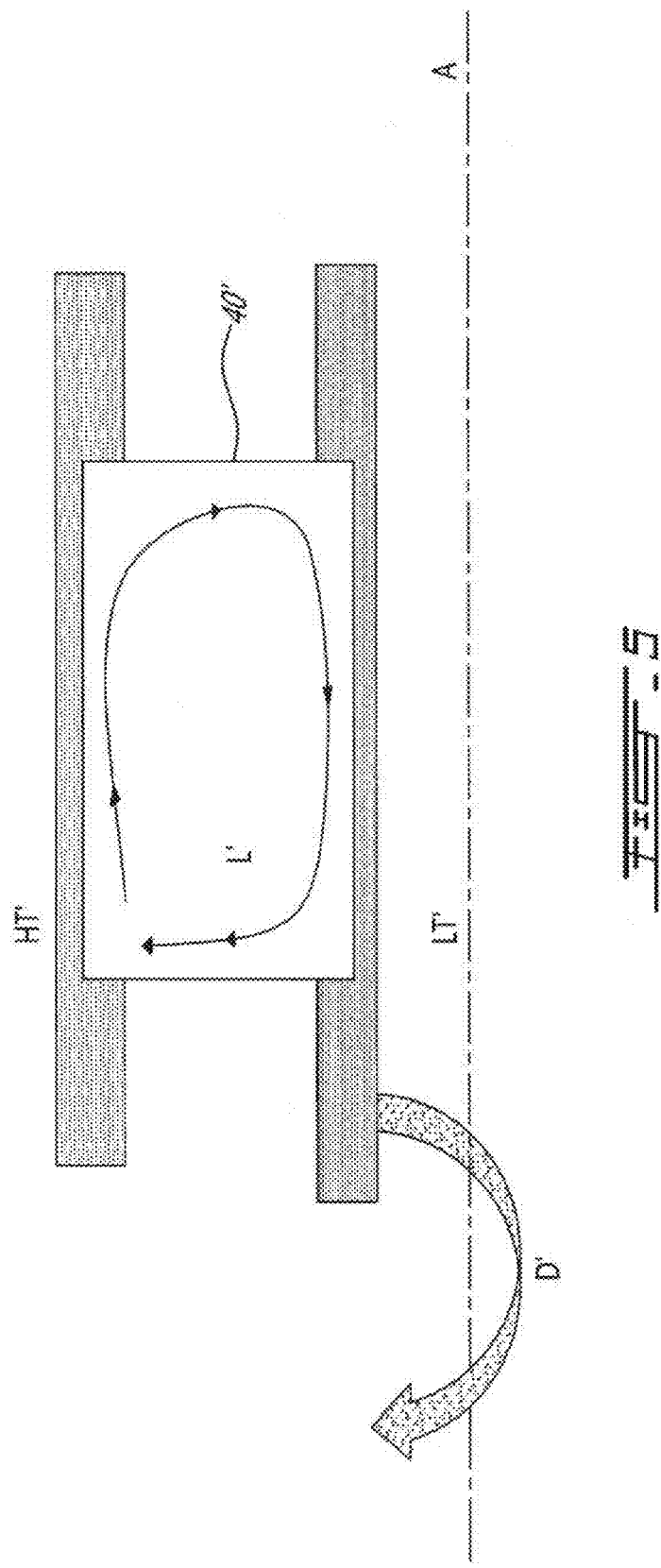

SEAL RUNNER

TECHNICAL FIELD

The application relates generally to gas turbine engines and, more particularly, to seal runners in such engines.

BACKGROUND OF THE ART

Gas turbine engines include a plurality of lubricated parts requiring sealing. For instance, various sealing arrangements may be used to keep the lubricating oil around a rotating shaft and its bearing. The sealing arrangements may include a rotating runner and one or more static radial contact seals facing the runner. When in use, the runner may be subject to various stresses (such as thermal and mechanical), which may damage the runner and/or the seals over time.

SUMMARY

In one aspect, there is provided a seal runner for a gas turbine engine, the seal runner comprising: an annular body having a sealed cavity defined therein, the cavity being elongated along an axial direction of the body and being annular, the cavity at least partially filled with a coolant, the coolant being liquid across a range of operating temperatures of the gas turbine engine, the coolant having a temperature dependent density across the range of operating temperatures of the gas turbine engine.

In another aspect, there is provided a gas turbine engine comprising: a rotatable shaft having an axially extending rotational axis; a seal runner connected around the shaft to rotate therewith, the seal runner in sealing engagement with at least one static seal, the seal runner including: an annular body including a sealed cavity filled at least partially with a coolant, the cavity being axially elongated and annular, the coolant being liquid across a range of operating temperatures of the gas turbine engine, the coolant having a temperature dependent density across the range of operating temperatures of the gas turbine engine, whereby when the gas turbine engine is in operation, a temperature gradient is defined across the seal runner and rotation of the seal runner recirculates the liquid coolant within the sealed cavity.

In a further aspect, there is provided a method of cooling a seal runner exposed to a temperature gradient, the method comprising: providing a coolant in an annular sealed cavity of the seal runner, the coolant being liquid at least at temperatures corresponding to the temperature gradient; and inducing recirculation of the coolant in the sealed cavity, the recirculation being a combined resultant of centrifugal loads caused by a rotation of the seal runner about a central axial axis thereof and of variations in a density of the coolant across the temperature gradient.

DESCRIPTION OF THE DRAWINGS

Reference is now made to the accompanying figures in which:

FIG. 5 is a schematic cross-sectional view of the runner of FIG. 3 showing an internal cavity according to another embodiment.

DETAILED DESCRIPTION

Figure 1:
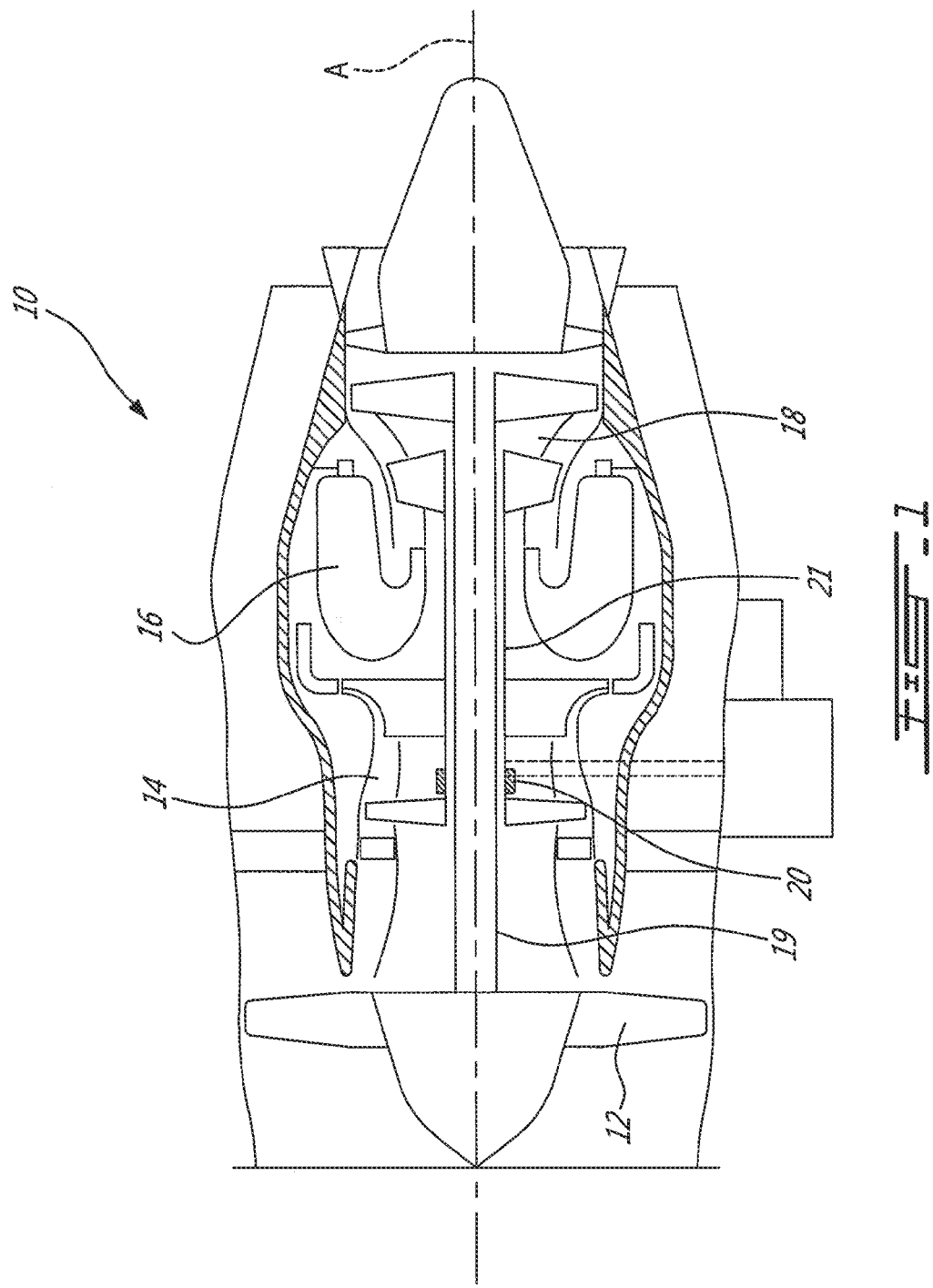
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, the low pressure compressor of the compressor section 14, and the low pressure turbine of the turbine section 18 are connected to each other by a low pressure shaft 19. Likewise, the high pressure compressor of the compressor section 14 and the high pressure turbine of the turbine section 18 are mounted on a high pressure shaft 21. The gas turbine engine 10 may include one or more seal arrangement(s) 20 disposed around the shafts 19 and 21 (only one example shown around shaft 21 in FIG. 1), which in a particular embodiment act to prevent lubricating oil from flowing away from the lubricated components. It is understood that the sealing assemblies could be used in different types of gas turbine engines, including turbofan, turboprop, turboshaft and APU engines.

Figure 2:
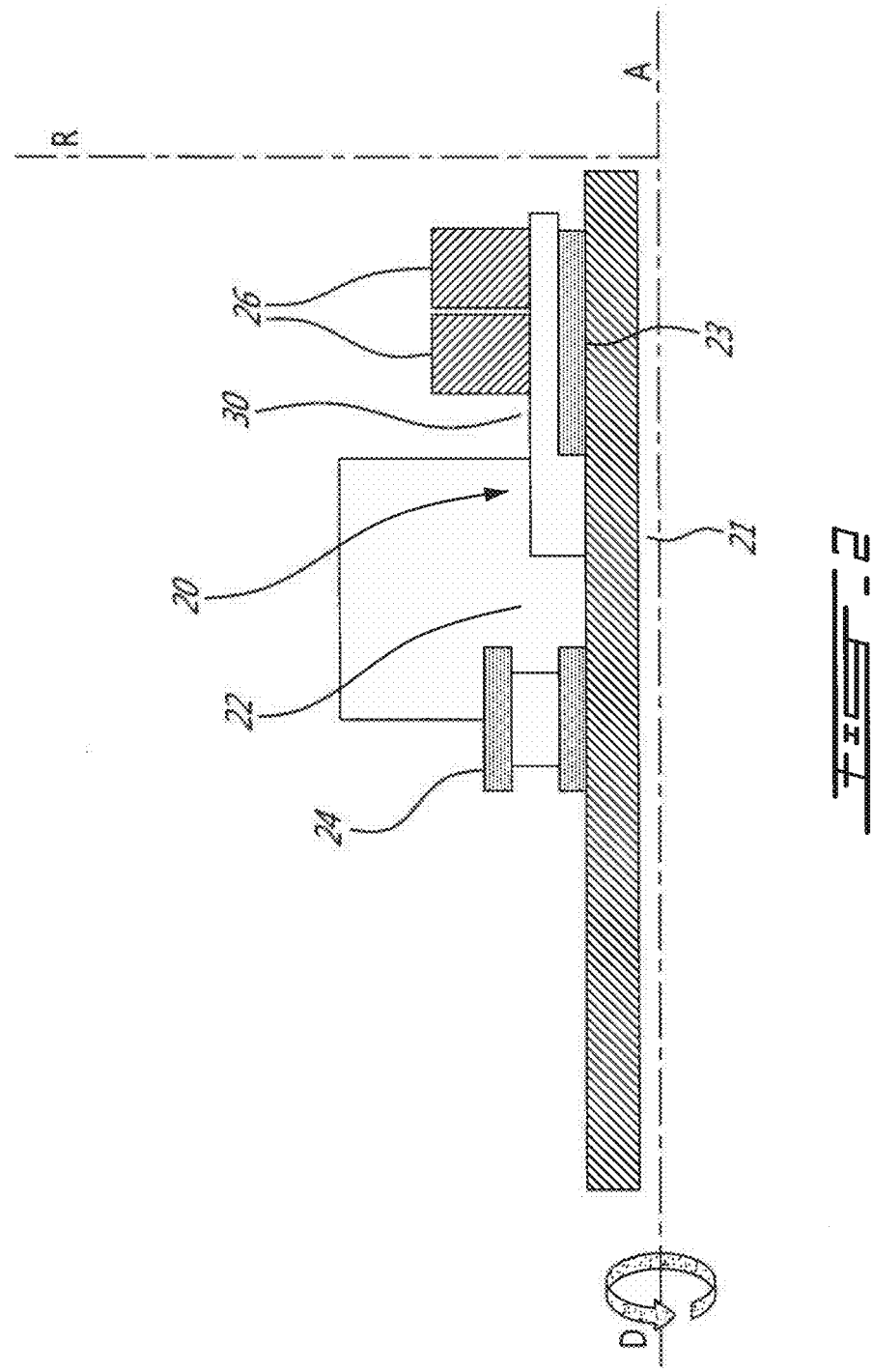
FIG. 2 is a schematic cross-sectional view of a portion of a gas turbine engine such as shown in FIG. 1, showing a seal arrangement.

Referring to FIG. 2, the seal arrangement 20 is disposed in an illustrative embodiment around the shaft 21. It is contemplated that the seal arrangement 20 could instead be on the shaft 19 or any other rotating shaft of the gas turbine engine 10. The shaft 21 defines an axial direction A and a radial direction R and rotates in a direction D. In the embodiment shown, the seal arrangement 20 minimizes or prevents oil leaking from an adjacent bearing cavity 22, which contains a mixture of lubricating oil and air. The bearing cavity 22 extends axially between a bearing 24 and the seal arrangement 20.

The seal arrangement 20, in this embodiment, includes two static seals 26 in contact with a seal runner 30. It is contemplated that the seal arrangement 20 could have only one or more than two static seals 26. The seal runner 30 is disposed around the shaft 21 and rotates with it. The static seals 26 are disposed radially outwardly from the seal runner 30 and do not rotate with the shaft 21 and the seal runner 30. The static seals 26 are, in one embodiment, carbon seals. Their sealing engagement with the seal runner 30 minimizes or prevents leakage of the lubricating oil from the bearing cavity 22.

Figure 3:
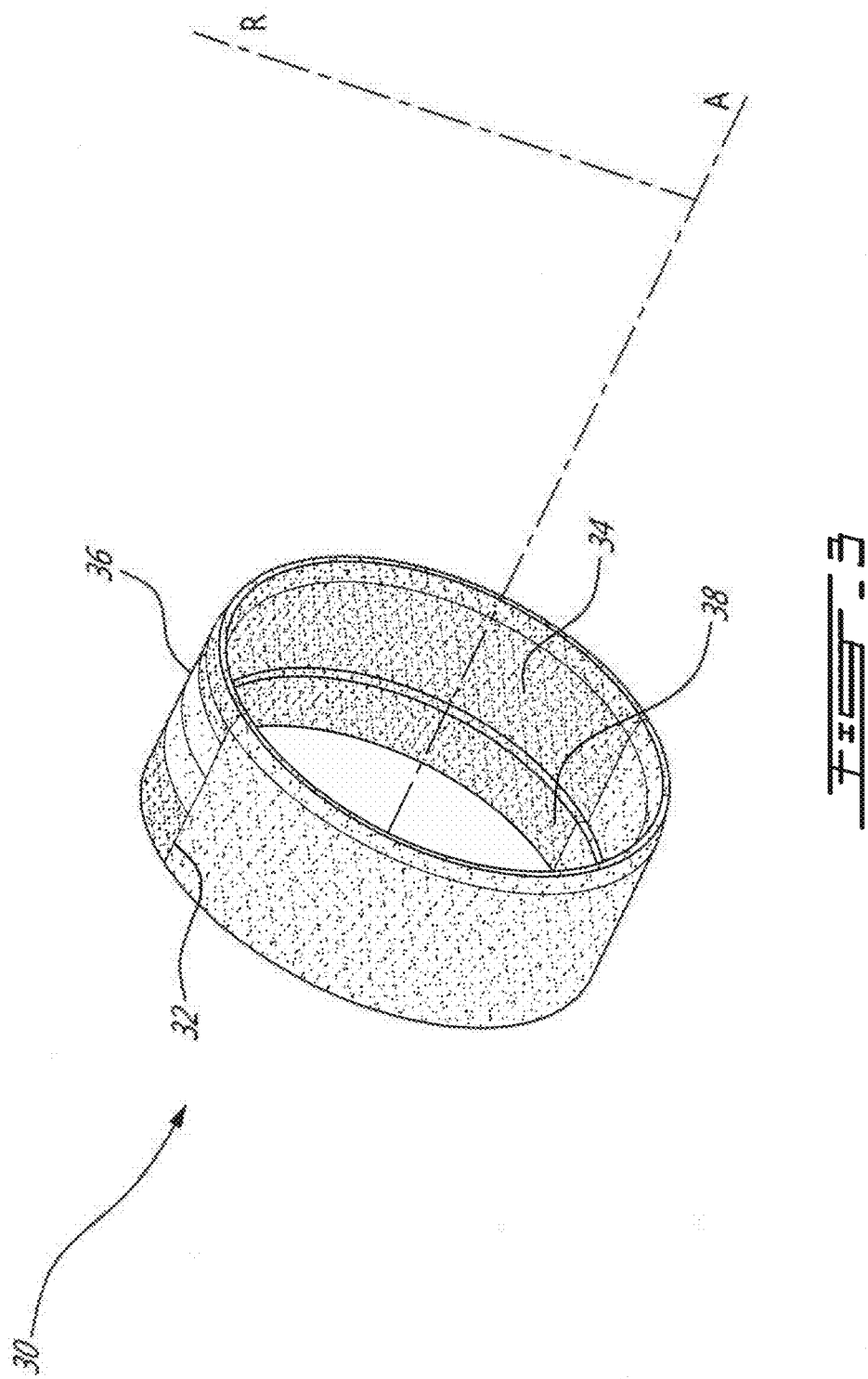
FIG. 3 is a schematic tridimensional view of a seal runner of the seal arrangement according to a particular embodiment.

Turning now to FIG. 3, the seal runner 30 includes an annular body 32. The body 32 of the seal runner 30 is made of a suitable material resistant to the temperatures and rotational forces typically experienced by rotating parts in gas turbine engines. In one embodiment, the body 32 may be made of stainless steel. The body 32 has an inner surface 34 which in a particular embodiment is in contact with the shaft 21 and/or with element(s) 23 (FIG. 2) surrounding the shaft 21, and an outer surface 36 in sealing engagement with the static seals 26. In the embodiment shown in FIG. 3, the inner wall 34 includes a step 38. It is contemplated that the inner wall 34 of the seal runner 30 could have various shapes, depending on the environment the runner 30 is placed in. For example, the step 38 could be omitted.

Figure 4:
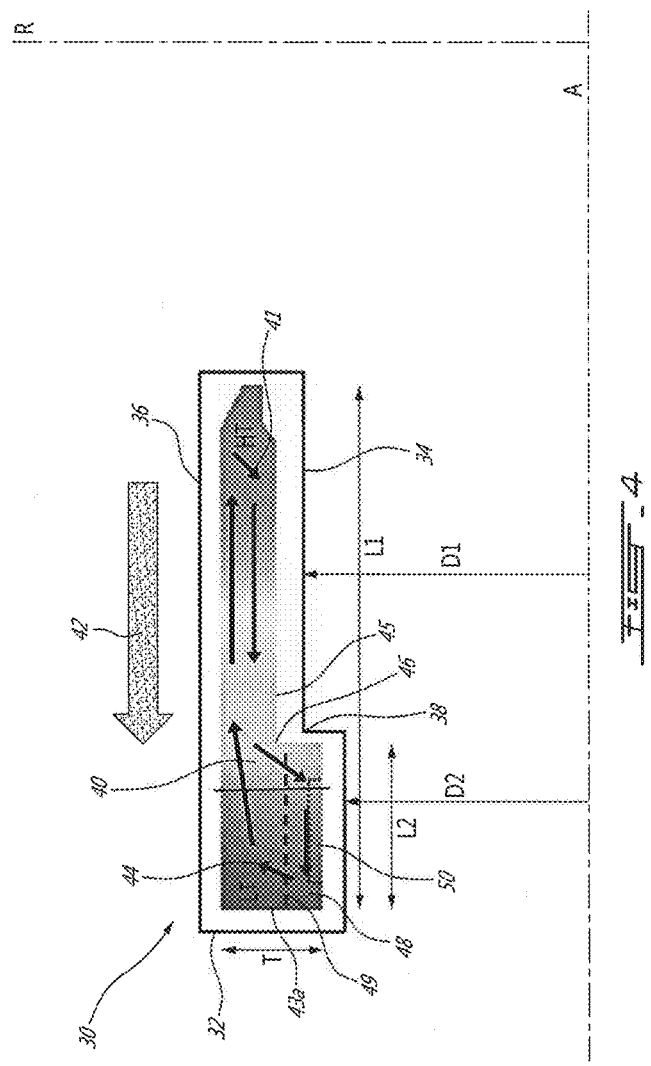
FIG. 4 is a schematic cross-sectional view of the runner of FIG. 3 showing an internal cavity according to a particular embodiment.

With reference to FIG. 4, the body 32 of the seal runner 30 includes in its interior a sealed annular cooling cavity 40 extending axially along a majority of an axial length of the body 32. The runner 30 and cooling cavity 40 are shown schematically in FIG. 4, and it is contemplated that the cooling cavity 40 could be more or less large (axially and/or radially) relative to the body 32. The cooling cavity 40 is shown herein as having a similar cross-sectional shape as the body 32 of the seal runner 30. It is however contemplated that the body 32 of the seal runner 30 and the cooling cavity 40 could have different shapes from one another.

The cooling cavity 40 is filled with a coolant which is used to cool the seal runner 30 when the gas turbine engine 10 is in operation. When the gas turbine engine 10 is in operation, the runner 30 is disposed between a zone of relatively low temperature LT (corresponding to the bearing cavity 22 for the particular embodiment shown in FIG. 3), and a zone of relatively hot temperature HT (corresponding to the contact with the static seals 26 for the particular embodiment shown in FIG. 3). It is understood that in other embodiments, the zones of relatively low temperature LT and of relatively hot temperature HT may correspond to different elements of the gas turbine engine. These zones create an axial gradient of temperature across the runner 30. The coolant filling the cavity 40 is a heat conducting material acting to transfer heat from the high temperature zone HT toward the low temperature zone LT. A general direction of cooling is illustrated by arrow 42.

The cooling cavity 40 could be partially or totally filed with the coolant. In a particular embodiment, the more coolant fills the cooling cavity 40, the better the cooling. The coolant is selected from materials which are liquid at those temperatures typically experienced by the seal runner 30 when the gas turbine engine 10 is in operation, i.e. liquid at least across a range of operating temperatures of the gas turbine engine. In a particular embodiment, the range of operating temperatures of the gas turbine engine for which the coolant is liquid is between about −50 deg.C. and 230 deg.C. In another embodiment, the range of operating temperatures of the gas turbine engine for which the coolant is liquid is between about 75 deg.C and 230 deg.C. The range of operating temperatures may depend on external conditions such as ambient air temperature, and internal conditions, such as speed of rotation of the engine.

Regarding the external conditions, the air temperature may differ depending on the weather and altitude of the aircraft. The gas turbine engine 10 may, for example, operate only when external ground temperatures are comprised between −50 deg. C and 55 deg C depending on the weather. The range [−50 deg. C, 55 deg. C] may thus be the temperature around the seal runner 30 when the engine is starting to run. In another example, the temperatures around the seal runner 30 may be about 75 deg. C at idle in cold days to 230 deg. C or more in hot days when the engine is running from ground idle to maximum take-off speeds.

Regarding the internal conditions, temperatures around the runner 30 may vary depending on whether the gas turbine engine 10 is not running or running, and if running whether at high speeds or low speeds. When the gas turbine engine 10 is running at high speeds, higher temperatures are generated (for example more friction occurs with the static seals 26). An example of a high speed situation is when the aircraft is flying. Lower temperature environments may take place when the gas turbine engine 10 is not running or running at low speeds, for example idling. In a particular embodiment, the range of operating temperatures for which the coolant is liquid includes the temperature at high speed operation (flight) but does not include the temperatures at low speed operation (idle), so that the coolant may be solid at idle. In the case of a coolant solid at idle, the coolant may fill completely the cavity 40 to avoid unbalance on the rotating shaft and rapid conversion to liquid when the engine runs above idle.

Whatever the range of operating temperatures of the gas turbine engine, the coolant is liquid when the engine is running at at least medium and high speeds. In a particular embodiment, the coolant is solid at ambient temperature when the engine is not running but liquid when the engine is running (even at low speeds). In another embodiment, the coolant may be liquid when the engine is both running and not running. The coolant is chosen to be liquid at all the operating temperatures, including the highest temperatures.

The coolant is chosen to have a temperature dependent density at least across this range of operating temperatures. The variable density with the gradient of operation temperatures enables circulation of the coolant in the cavity 40 between the zones of different temperatures HT, LT. The determination of the coolant may include factors additional to the variability of the density and may depend on the application (in this example, for a gas turbine engine). For example, specific heat capacity can be used to determine which coolant to select. While usually a coolant with a large variation of density with temperature may be selected, a coolant with small density variations but large specific heat capacity may be also a valid choice of coolant. The choice of the coolant depend on multiple factors (density gradient, melting point, specific heat capacity) based on a specific application.

Various coolants being heat conducting, liquid with the range of operating temperatures and having a variable density within the range of operation temperatures may be selected to fill the cavity 40. In a particular embodiment, the coolant is a metal, metal alloy or a salt. Examples of suitable coolants include, but are not limited to, NaK (eutectic), Na, PbBi. (eutectic), K, Pb, Hg, Li, Cs, Bi, Ga, In, NaKCs, and PbLi. In one embodiment, the coolant is one of NaK, PbBi, Hg, Ga, NaKCs, Cs. In one embodiment, the coolant is NaK. NaK may for example be selected for engine applications as it has a low meting point and high vaporization point. Below is reproduced a table of characteristics of the above examples of coolant:

| Coolant | Lowest temp when liquid (deg. C.) | Highest temp when liquid (deg. C.) | Example 1 of density at a particular temperature | Example 2 of density at a particular temperature |
|---|---|---|---|---|
| NaK (eutectic) | −12.6 | 785 | 866 kg/m3 at 21 deg. C. | 855 kg/m3 at 100 deg. C. |
| PbBi (eutectic) | 125 | 1638 | 10520 kg/m3 at 150 deg. C. | 10150 kg/m3 at 450 deg. C. |
| Na | 98 | 883 | 925 kg/m3 at 100 deg. C. | 834 kg/m3 at 490 deg. C. |
| K | 64 | 774 | 821 kg/m3 at 100 deg. C. | 739 kg/m3 at 450 deg. C. |
| Pb | 328 | 1745 | 10650 kg/m3 at 350 deg. C. | 9900 kg/m3 at 950 deg. C. |
| HG | −39 | 357 | 13351 kg/m3 at 100 deg. C. | 12510 kg/m3 at 450 deg. C. |
| Li | 181 | 1347 | 513 kg/m3 at 200 deg. C. | 491 kg/m3 at 450 deg. C. |
| Ca | 29 | 678 | 1797 kg/m3 at 100 deg. C. | 1597 kg/m3 at 450 deg. C. |

-continued

| Coolant | Lowest temp when liquid (deg. C.) | Highest temp when liquid (deg. C.) | Example 1 of density at a particular temperature | Example 2 of density at a particular temperature |
| --- | --- | --- | --- | --- |
| Bi | 271 | 1552 | 10011 kg/m3 at 315 deg. C. | 9467 kg/m3 at 760 deg. C. |
| Ga | 30 | 2403 | 6039 kg/m3 at 100 deg. C. | 5820 kg/m3 at 450 deg. C. |
| In | 156 | 2080 | 7010 kg/m3 at 160 deg. C. | 6907 kg/m3 at 307 deg. C. |
| NaKCs | −78 | N/A | 1420 kg/m3 at 0 deg. C. | 1235 kg/m3 at 450 deg. C. |
| PbLi | 235 | N/A | 9495 kg/m3 at 240 deg. C. | 9376 kg/m3 at 380 deg. C. |

The combined effect of the rotation of the seal runner 30 and the temperature dependent density of the coolant induce displacement of the liquid coolant, in permanent buoyancy-driven recirculation in a generally circular manner of the coolant between the zones of higher temperatures HT and zones of lower temperatures LT.

Referring specifically to FIG. 5, the concept of recirculation will be described for a radially oriented temperature gradient in another embodiment of the cooling cavity 40' for a seal runner exposed to a radially oriented temperature gradient, from the lower temperatures zone LT' being axially aligned with and disposed radially inwardly from the higher temperatures zone HT', with the seal runner being located therebetween.

When using a coolant having a temperature dependent density, the gradient of temperatures creates a gradient of densities in the coolant, the greater densities being adjacent the lower temperatures zone LT', and the lower densities being adjacent the higher temperatures zone HT'. As a result, relatively heavier portions of the coolant (i.e. having a greater density) are found adjacent the lower temperatures zone LT. When the cavity is rotated about itself (illustrated by arrow D'), those heavier portions of the coolant are pushed radially outwardly due to centrifugal forces. The space left by the heavier portions is filled by the lighter and hotter portions of the coolant. Because of the temperature gradient, the hotter portions then become cooler and vice-versa, which creates a looped circulation (or recirculation) of the coolant illustrated by arrows L'. The arrows L' are a schematic presentation of the recirculation. For example, there may be more than one looped circulation in the cavity 41' and the looped circulation may be in various directions.

In another particular embodiment where the high temperature and low temperature zones HT, LT are axially spaced apart, the cooling cavity 40 is shaped to help coolant circulation along the axial direction 42, which is the direction of the gradient of temperatures. To induce axial displacement of the liquid coolant, the cooling cavity 40 is shaped to enable recirculation of the coolant when the gas turbine engine 10 is in operation upon rotation of the seal runner 30.

In the particular embodiment shown in FIG. 4, the gradient of operation temperatures is axially oriented and recirculation of the coolant is illustrated by arrows 41. The shape of the cooling cavity 40 helps to force axial displacement of the coolant. In one embodiment, the cooling cavity 40 has a thickness T (i.e. radial length of the cooling cavity 40) greater toward the zone of lower temperatures LT compared to the zone of higher temperatures HT. The greater thickness T toward the zone of lower temperatures LT disrupts the local circulation of the coolant. Because of the varying density of the coolant along the gradient of temperatures, relatively hotter (lighter) portions of coolant tend to accumulate at the inner wall 34 of the cooling cavity 40 and thus flow toward the parts of the cavity 40 having the increase of thickness T, which is toward the zone of lower temperatures LT. The cooler (heavier) portions of the coolant are moved toward an outer wall of the cavity 40 and toward the zone of higher temperatures HT, thereby providing a globally axial looped displacement of the coolant.

In the embodiment shown, the increased thickness at the low temperature zone LT is defined by the cavity 40 being stepped. The cavity 40 thus includes a main cavity portion 44 and an auxiliary cavity portion 48 recessed relative to the main cavity portion 44 and in complete fluid communication (i.e. opened into) with the main cavity portion 44. The main cavity portion 44 and the auxiliary cavity portion 48 do not have a physical delimitation between them, but for ease of understanding, a dotted line 49 is drawn in FIG. 4 to show where the cavity portions 44, 48 meet. The cavity portions 44, 48 form the cooling cavity 40.

In the embodiment shown, the main cavity portion 44 is annular and axially elongated, with a rectangular cross-section. The auxiliary cavity portion 48 is also annular with a rectangular cross-section, but has a smaller axial length L2 than an axial length L1 of the main cavity portion 44. The axial length L2 of the cavity 40 is thus smaller at an inner diameter D2 relative to the axial length L1 at an outer diameter D1.

The difference in axial length between the cavity portions 44, 48 creates a step 46. The auxiliary cavity portion 48 is disposed radially inwardly relative to the main cavity portion 44, and has a common side with the main cavity portion 44 which ensures full communication between the two cavity portions 44, 48, and recirculation across the cavity portions 44, 48. The common side is a virtual side illustrated by the dotted line 49 across the cooling cavity 40. The auxiliary cavity portion 48 has a common axial end 43a with the main cavity portion 44. The axial end 43a is disposed toward the bearing cavity 22 where the zone of lower temperature LT is. In a particular embodiment, having the auxiliary cavity portion 48 disposed toward the zone of lower temperature LT induces movement of the hotter portions of the coolant toward the cooler portions of the coolant.

While the embodiment shown herein shows the two cavity portions 44, 48 having a common axial location at the zone of lower temperature LT, it is contemplated that the auxiliary cavity portion 48 could be offset axially from the main cavity portion 44 toward the zone of higher temperature HT. It is also contemplated that the auxiliary cavity portion 48 could be omitted, though, in a particular embodiment, the stepped configuration of the cavity 40 may provide better cooling efficiency by enhancing the axial displacement of the coolant.

Figure 6A:
FIG. 6A to 6H show various embodiments of internal cavities for the runner of FIG. 3.
Figure 6B:
Figure 6C:
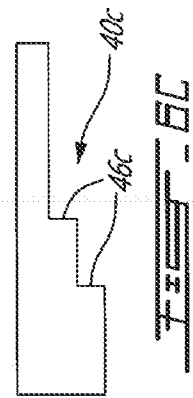
Figure 6D:
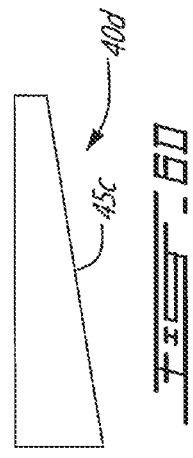
Figure 6E:
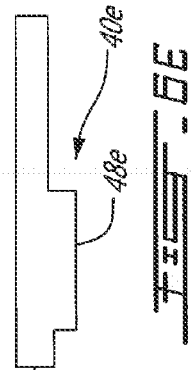
Figure 6F:
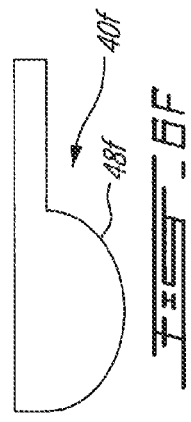
Figure 6G:
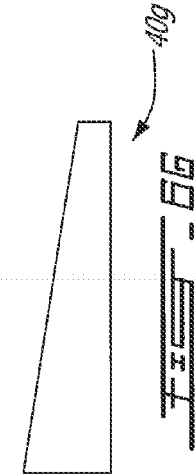
Figure 6H:
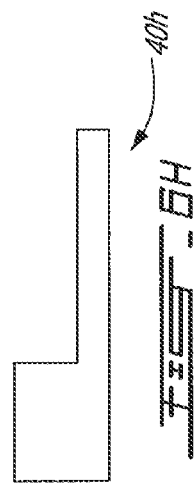

While the cavity 40 is described having a stepped inner wall 45, it is contemplated that the cavity 40 could have various shapes of the inner wall 45 and/or outer wall which define an increased thickness T toward the zone of lower temperatures LT. Non-exhaustive examples of possible shapes of the cavity 40 for a runner 30 having an axial gradient of temperature are shown in FIGS. 6A to 6F. FIG. 6A shows an internal cavity 40a with an inclined step 46a. FIG. 6B shows an internal cavity 40b with a curved step 46b. FIG. 6C shows an internal cavity 40c with two steps 46c. FIG. 6D shows an internal cavity 40d with an angled inner wall 45d defining a cavity thickness increasing linearly from the zone of lower temperature to the zone of higher temperature. FIG. 6E shows an internal cavity 40e with an auxiliary cavity portion 48e axially offset relative to a main cavity portion 44e. FIG. 6F shows an internal cavity 40f with an auxiliary cavity portion 48f having a curved inner wall. FIG. 6G defines an internal cavity 40g with an angled outer wall defining a cavity thickness increasing linearly from the zone of lower temperature to the zone of higher temperature. FIG. 6H defines an internal cavity 40h where the auxiliary cavity portion is located radially outwardly of the main cavity portion. The cavity could also have combinations of the above features of FIGS. 6A to 6H. For example, the auxiliary cavity portion may be curved and offset. Similar or different shapes of the cavity for runners disposed in radial gradients of temperatures are also contemplated. The cavity 40 could include one or more structures facilitating heat transfer without impairing recirculation (here axial displacement). For example, the cavity 40 could include axially extending fins 50 (shown in phantom in FIG. 4) in the auxiliary cavity portion 48.

The seal runner 30 may be manufactured, in one embodiment, by forming an open annular cavity corresponding to the cavity 40 but with an end open (for example the inner wall 45) or a plurality of holes to access the cavity 40. The open cavity may then be at least partially filled with the selected coolant. Where the coolant may react with ambient air, the filing may be made under vacuum. As mentioned earlier, the coolant is selected to have a density variable with the gradient of temperatures of the gas turbine engine. The coolant is liquid within a range of operating temperatures of the gas turbine engine. Once the open cavity is filled with the coolant, the cavity may be sealed by providing a wall closing the open end and sealing it thereto (or by sealing the holes).

A radial thermal gradient (FIG. 5) and an axial thermal gradient (FIG. 4) have been presented. It is contemplated that the runner 30 could be subject to a combination of these two thermal gradients (i.e. oblique gradient).

Although a turbofan engine is shown in FIG. 1, it is contemplated that the seal runner 30 could be used in other types of gas turbine engines which have a configuration involving a rotating shaft and a static seal.

The above description is meant to be exemplary only, and one skilled in the art will recognize that changes may be made to the embodiments described without departing from the scope of the invention disclosed. The seal runner could include other cooling feature to further enhance cooling. For example, the end portion of the seal runner by the bearing cavity could be oiled cooled. Other modifications which fall within the scope of the present invention will be apparent to those skilled in the art, in light of a review of this disclosure, and such modifications are intended to fall within the appended claims.

The invention claimed is:

1. A seal runner for a gas turbine engine, the seal runner comprising:
an annular body having a sealed cavity defined therein, the cavity being elongated along an axial direction of the body and being annular, the cavity at least partially filled with a coolant, the coolant being liquid across a range of operating temperatures of the gas turbine engine, the coolant having a temperature dependent density across the range of operating temperatures of the gas turbine engine.

2. The seal runner as defined in claim 1, wherein the range of operating temperatures is at least from about −50 deg.C. to 230 deg.C.

3. The seal runner as defined in claim 2, wherein the range of operating temperatures is at least from about 75 deg.C. to 230 deg.C.

4. The seal runner as defined in claim 1, wherein the coolant is a metal, a metal alloy or a salt.

5. The seal runner as defined in claim 1, wherein the cavity has an inner wall and an outer wall disposed radially outwardly from the inner wall, the inner wall being stepped.

6. The seal runner as defined in claim 1, wherein the cavity includes a main cavity portion and an auxiliary cavity portion opened into the main cavity portion, the auxiliary cavity portion being disposed radially inwardly from the main cavity portion, the auxiliary cavity portion having an axial length shorter than an axial length of the main cavity portion.

7. The seal runner as defined in claim 1, wherein the coolant is solid at ambient temperature.

8. The seal runner as defined in claim 1, wherein the cavity is completely filled with the coolant.

9. A gas turbine engine comprising:
a rotatable shaft having an axially extending rotational axis;
a seal runner connected around the shaft to rotate therewith, the seal runner in sealing engagement with at least one static seal, the seal runner including:
an annular body including a sealed cavity filled at least partially with a coolant, the cavity being axially elongated and annular, the coolant being liquid across a range of operating temperatures of the gas turbine engine, the coolant having a temperature dependent density across the range of operating temperatures of the gas turbine engine, whereby when the gas turbine engine is in operation, a temperature gradient is defined across the seal runner and rotation of the seal runner recirculates the liquid coolant within the sealed cavity.

10. The seal runner as defined in claim 9, wherein the range of operating temperatures is at least from about −50 deg.C. to 230 deg.C.

11. The seal runner as defined in claim 10, wherein the range of operating temperatures is at least from about 75 deg.C. to 230 deg.C.

12. The gas turbine engine as defined in claim 9, wherein the temperatures gradient is axially oriented, and the coolant recirculates in the cavity generally axially.

13. The gas turbine engine as defined in claim 9, wherein the coolant is a metal, a metal alloy or a salt.

14. The gas turbine engine as defined in claim 9, wherein the cavity has an inner wall and an outer wall disposed radially outwardly from the inner wall, the inner wall being stepped.

15. The gas turbine engine as defined in claim 9, wherein the cavity includes a main cavity portion and an auxiliary cavity portion opened into the main cavity portion so that the recirculation takes place across the main cavity portion and the auxiliary cavity portion, the auxiliary cavity portion being disposed radially inwardly from the main cavity portion, the auxiliary cavity portion having an axial length shorter than an axial length of the main cavity portion.

16. The gas turbine engine as defined in claim 15, wherein the cavity extends axially between a first end and a second end, and the main cavity portion extends axially between the first end and the second end, and the auxiliary cavity portion extends axially between the first end and a third end, the third end being disposed axially between the first end and the second end.

17. The gas turbine engine as defined in claim 9, wherein the coolant is solid at ambient temperature.

18. A method of cooling a seal runner exposed to a temperature gradient, the method comprising:
providing a coolant in an annular sealed cavity of the seal runner, the coolant being liquid at least at temperatures corresponding to the temperature gradient; and
inducing recirculation of the coolant in the sealed cavity, the recirculation being a combined resultant of centrifugal loads caused by a rotation of the seal runner about a central axial axis thereof and of variations in a density of the coolant across the temperature gradient.

19. The method as defined in claim 18, wherein the temperature gradient is axial and the coolant is recirculated axially.

20. The method as defined in claim 18, wherein the cavity includes a main cavity portion and an auxiliary cavity portion being disposed radially inwardly from the main cavity portion, the auxiliary cavity portion having an axial length shorter than an axial length of the main cavity portion, and inducing recirculation of the coolant includes increasing a density of the coolant in the auxiliary cavity portion through contact with a coolest side of the temperature gradient, circulating the coolant with increased density radially outwardly and axially out of the auxiliary cavity portion, lowering a density of the coolant in the main cavity portion through contact with a hottest side of the temperature gradient, and circulating the coolant with lowered density radially inwardly and into the auxiliary cavity portion.

* * * * *